United States Patent
Yamane et al.

(10) Patent No.: US 10,220,598 B2
(45) Date of Patent: Mar. 5, 2019

(54) MULTILAYER COATING FILM AND COATED OBJECT COMPRISING LUSTER FLAKE COATED WITH COLORING MATERIALS

(71) Applicant: MAZDA MOTOR CORPORATION, Hiroshima (JP)

(72) Inventors: Takakazu Yamane, Hiroshima (JP); Keiichi Okamoto, Hiroshima (JP); Kouji Teramoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/512,010

(22) PCT Filed: Nov. 2, 2015

(86) PCT No.: PCT/JP2015/005509
§ 371 (c)(1),
(2) Date: Mar. 16, 2017

(87) PCT Pub. No.: WO2016/088295
PCT Pub. Date: Jun. 9, 2016

(65) Prior Publication Data
US 2017/0291401 A1 Oct. 12, 2017

(30) Foreign Application Priority Data

Dec. 3, 2014 (JP) .................................. 2014-244886
Mar. 31, 2015 (JP) .................................. 2015-071971

(51) Int. Cl.
*B32B 5/16* (2006.01)
*B32B 27/20* (2006.01)
(Continued)

(52) U.S. Cl.
CPC ............ *B32B 27/20* (2013.01); *C09C 1/0081* (2013.01); *C09C 1/642* (2013.01); *C09C 1/644* (2013.01);
(Continued)

(58) Field of Classification Search
CPC ....... C09C 1/0081; C09C 1/642; C09C 1/644; C09C 1/648; C01P 2004/20; C01P 2004/62; C01P 2004/84; C01P 2006/60
(Continued)

(56) References Cited

U.S. PATENT DOCUMENTS

2005/0214483 A1* 9/2005 Fujieda .................. B05D 7/577
428/31
2005/0252416 A1* 11/2005 Venturini ............... B82Y 30/00
106/403
(Continued)

FOREIGN PATENT DOCUMENTS

CN      1703468 A     11/2005
CN    101120059 A      2/2008
(Continued)

OTHER PUBLICATIONS

ASTM D-1003-00 Appendixes, downloaded 2018 (Year: 2018).*
(Continued)

*Primary Examiner* — Hoa (Holly) Le
(74) *Attorney, Agent, or Firm* — Studebaker & Brackett PC

(57) ABSTRACT

An multi-layer coating film 12 includes: a luster coat 15 containing a luster material; a color coat 16 applied on the luster coat 15, containing a pigment 21, and having translucency; and a coloring flake 22 included in the luster coat 15 and acting as the luster material to color a surface of a luster flake with a coloring material in the same type of color as a color type of the color coat 16.

7 Claims, 11 Drawing Sheets

(51) Int. Cl.
*C09D 7/40* (2018.01)
*C09C 1/00* (2006.01)
*C09C 1/64* (2006.01)
*C09D 201/00* (2006.01)
*C09D 5/28* (2006.01)
*C09D 5/36* (2006.01)
*C09D 7/61* (2018.01)
*C09D 5/29* (2006.01)

(52) U.S. Cl.
CPC .............. *C09D 5/28* (2013.01); *C09D 5/29* (2013.01); *C09D 5/36* (2013.01); *C09D 7/61* (2018.01); *C09D 7/68* (2018.01); *C09D 7/70* (2018.01); *C09D 201/00* (2013.01); *B32B 2307/414* (2013.01)

(58) Field of Classification Search
USPC ............. 428/144, 148, 212, 403, 323, 328
See application file for complete search history.

(56) References Cited

U.S. PATENT DOCUMENTS

| 2007/0051275 | A1* | 3/2007 | Muller | A61K 8/0241 |
| | | | | 106/403 |
| 2008/0115693 | A1 | 5/2008 | Hashizume | |
| 2008/0318012 | A1 | 12/2008 | Domnick et al. | |
| 2009/0017082 | A1* | 1/2009 | Morimitsu | A61K 8/19 |
| | | | | 424/401 |
| 2015/0202655 | A1 | 7/2015 | Nakano et al. | |

FOREIGN PATENT DOCUMENTS

| CN | 101384674 A | 3/2009 |
| JP | H10-330657 A | 12/1998 |
| JP | 2001-232282 A | 8/2001 |
| JP | 2002-121488 A | 4/2002 |
| JP | 2002-273332 A | 9/2002 |
| JP | 2005-305424 A | 11/2005 |
| JP | 2008-126095 A | 6/2008 |
| JP | 2009-511725 A | 3/2009 |
| JP | 2011-251252 A | 12/2011 |
| WO | 2007/094253 A1 | 8/2007 |
| WO | 2014/033974 A1 | 3/2014 |

OTHER PUBLICATIONS

International Search Report issued in PCT/JP2015/005509; dated Feb. 2, 2016.

Toyo Aluminium K.K.; "Coloring Aluminium Paste"; Product Report; Autumn 2012.

* cited by examiner

MULTILAYER COATING FILM AND COATED OBJECT COMPRISING LUSTER FLAKE COATED WITH COLORING MATERIALS

TECHNICAL FIELD

The present invention relates to a multi-layer coating film and a coated object.

BACKGROUND ART

A typical base material, such as an automotive body and an automotive part, has a multi-layer coating film applied on a surface of the base material, so that the applied multi-layer coating film protects, and improves the appearance of, the base material. For example, Patent Document 1 discloses a multi-layer coating film. In order to present a golden appearance having high chroma and lightness with luster, the coating film includes: a luster base coating film containing a coloring aluminum pigment, an aluminum pigment, and a color pigment; and a clear coating film applied to the luster base coating film. The coloring aluminum pigment is a lustrous flake pigment made of aluminum flakes vapor-deposited with a coating composition including oxidized iron. With the hue of the coloring aluminum pigment is set to be a reference (0 position) of a Munsel hue circle divided into 100 sectors, the color pigment includes at least two kinds of pigments each of which has a hue number ranging from −3 to −15 and from +3 to +15 when the hue circle includes a decreasing hue number to −50 in a counterclockwise direction and an increasing hue number to +50 in a clockwise direction. Furthermore, the color pigment may be blended with the clear coating film.

CITATION LIST

Patent Document

PATENT DOCUMENT 1: Japanese Unexamined Patent Publication No. 2011-251252

SUMMARY OF THE INVENTION

Technical Problem

As illustrated in FIG. 1, when a color coat (e.g. a color-clear coating film) 4 including a pigment 3 and having translucency is applied on a luster coat 2 containing a luster material (e.g. aluminum flakes) 1, uneven thickness of the color coat 4 could cause color unevenness. Specifically, light absorbance varies between a thick portion and a thin portion of the color coat 4. As a result, a bright spot and a dark spot appear, causing unevenness in color tone and contrast.

A counter measure to the problem is a known technique illustrated in FIG. 2; that is, the pigment 3, having the same type of color as that of the color coat 4, is added to the luster coat 2 to reduce color unevenness. However, FIG. 2 shows that the pigment 3 does not necessarily disperse evenly throughout the luster coat 2. Typically, the pigment 3 disperses unevenly. For example, a portion of the surface layer of the luster coat 2 contains the pigment 3 in large amount above the luster material 1. Another portion of the surface layer of the luster coat 2 contains the pigment 3 in small amount above the luster material 1. In this case, the portion containing the pigment 3 in large amount presents low light reflection (appears dark), and the portion containing the pigment 3 in small amount presents high light reflection (appears bright). Hence, the luster coat 2 containing the pigment 3 does not necessarily reduce the color unevenness.

Moreover, as illustrated in FIG. 2, the uneven dispersal of the pigment 3 in the luster coat 2 causes a problem; that is, the luster material 1 is not oriented in parallel with the surface of the luster coat 2 and some of the luster material 1 is angled, leading to partial or overall reduction in the brightness of a multi-layer coating film.

The present invention reduces unevenness in color tone and contrast of a multi-layer coating film including a color coat applied on a luster coat.

Solution to the Problem

In order to solve the above problems, the present invention adopts coloring flakes as a luster material for a luster coat.

Specifically, a multi-layer coating film disclosed here includes: a luster coat containing a luster material; a color coat applied on the luster coat and having translucency; and a coloring flake included in the luster coat and acting as the luster material to color a surface of a luster flake with a coloring material in the same color type as a color type of the color coat.

When light enters the luster coat of this multi-layer coating film, the coloring material in the coloring flake reflects light having a wavelength unique to the coloring material and absorbs another light having another wavelength. Thus, even if the thickness of the color coat is uneven, the light passing the color coat through and entering the luster coat is either absorbed into or reflected off the coloring flake colored in the same color type as a color type of the color coat. Such a feature may reduce occurrence of color unevenness.

As described above, the present invention reduces color unevenness using the coloring flakes. Hence, a pigment is not necessarily added to the luster coat. However, a small amount of pigment may be added to the luster coat as needed. Note that if a pigment is added to the luster coat, the pigment beneficially has a pigment weight concentration (PWC) of 5.0% or lower. A low or zero concentration of the pigment in the luster coat contributes to reducing the occurrence of color unevenness due to uneven dispersal of the pigment on or above the luster material, and moreover, reducing the risk that the luster material is inappropriately oriented by the pigment. Such features are advantageous in maintaining brightness.

In a beneficial embodiment, in the coloring flake, the coloring material may be dispersedly attached to the surface of the luster flake, such that the luster flake is partially exposed. Such a feature allows an exposed portion of the luster flake to specularly reflect light. When a reflecting angle (an angle formed between the surface normal of the coloring flake and a reflection direction) of the light becomes large, the coloring material dispersedly attached to the luster flake acts as so-called steric hindrance, and the reflected light tends to be blocked by the coloring material. As a result, the reflected light becomes low in brightness. In particular, intensity of the reflected light is low toward shade (an incident side away from the specular reflection side, and low in brightness of the reflected light). Hence, the intensity of the light reflected off the coloring flake significantly changes depending on a reflecting angle. Such a feature achieves a great flip-flop effect.

Here, the statement "the luster flake is partially exposed" means that the exposed part has no coloring material. The statement may be interpreted that the exposed part has a translucency film or a translucent particle such as an acrylic bead and a glass bead.

In the coloring flake, the luster flake may have a rate of an exposed area ranging from 20% to 85% inclusive. Such a feature contributes to a higher flop index (FI), which is advantageous in improving the flip-flop effect.

In an another beneficial embodiment, the coloring flake may include coloring materials acting as the coloring material and each having a different total luminous transmittance of visible light, and the coloring materials, each having the different total luminous transmittance, may be attached to the surface of the luster flake in a mottled state.

In this embodiment, the light is absorbed much in a portion provided with a coloring material included in a coloring flake and having a low total luminous transmittance; whereas, intensity of the light specularly reflected off the luster flake is high in a portion provided with a coloring material having a high total luminous transmittance, since the light tends to pass through the coloring material and reach the luster flake. When a reflecting angle of the light becomes large also in this embodiment, the reflected light is blocked by the coloring material dispersedly attached to the luster flake and having the low total luminous transmittance. As a result, the reflected light becomes low in brightness. In particular, intensity of the reflected light is low toward shade, achieving a great flip-flop effect.

Beneficially, In still another embodiment, the multi-layer film may include: two coloring materials acting as the coloring material and each having a different total luminous transmittance, wherein in the coloring flake, one of the two coloring materials may be higher in the total luminous transmittance than an other one of the two coloring materials, the one coloring material having an area rate ranging from 25% to 80% inclusive. Such a feature contributes to a higher FI while using the coloring flake, which is advantageous in improving the flip-flop effect.

In still another beneficial embodiment, the coloring material may granular, and have an average particle size of 300 nm or smaller. Such a feature allows the coloring flake to have high brightness because diffuse reflection, caused by the granular coloring material, reduces. This is advantageous in improving the flip-flop effect.

The luster flakes may be aluminum flakes made of grounded aluminum foil. Furthermore, the luster flakes may be vapor-deposited aluminum flakes of which the surfaces are provided with enhanced smoothness. The vapor-deposited aluminum flakes are made of aluminum film vapor-deposited on a thin base material and grounded. Such aluminum flakes and vapor-deposited aluminum flakes are beneficial in increasing brightness and obtaining a metallic texture effect.

In still another beneficial embodiment, the coloring material has a deep color type such as red and black (a Munsell lightness value of 5 or below), in particular, in a blackish color. Specifically, as illustrated in FIGS. 1 and 2, color unevenness (in particular, a contrast) tend to occur when a black pigment is added to the color coat to obtain black, because uneven thickness of the color coat causes partial variations in absorption of light into the color coat. In view of reducing such color unevenness, it is meaningful to adopt a coloring material in a dark color type for the coloring flake in the luster coat.

In still another beneficial embodiment, the color coat may be colored black with a black pigment, and the coloring flake in the luster coat may be colored black with the coloring material. Color unevenness (in particular, a contrast) tends to occur when a black pigment is added to the color coat to obtain black, because uneven thickness of the color coat causes partial variations in absorption of light into the color coat. However, the above feature of the beneficial embodiment allows light to be absorbed also into the black coloring material of the coloring flake in the luster coat. Such a feature may reduce occurrence of the color unevenness.

In still another beneficial embodiment, the luster coat may be applied on a color base coat having the same type of color as the color type the color coat.

A thin coloring flake in the luster coat allows light entering the multi-layer coating film to pass through the coloring flake and to be reflected off a base. In this case, the color of the base affects an exterior paint color. In other words, the paint color appears cloudy. That is why the base coat is the color base coat in the same type of color as the color coat is in. Such a feature reduces the cloudy appearance of the paint color, and provides the paint color with high density, depth, and metallic texture effect.

Here, the same color type in achromatic color type means that a difference in Munsell lightness values between comparable colors is beneficially 5.0 or below. The same color type in chromatic color type means that one of the comparable colors is beneficially within the hue range of ±10 on the condition that a circle of the Munsell hue circle is divided into 100 sectors, the hue of the other one of the comparable colors is set to be a reference (0 position), and the hue circle includes a decreasing hue number to −50 in a clockwise direction and an increasing hue number to +50 in a counterclockwise direction.

In still another beneficial embodiment, a transparent clear coat may be applied on the color coat. Such a feature may provide the multi-layer coating film with acid and scratch resistance.

Examples of a coated object to which the multi-layer coating film is applied may be a body of an automobile, a motor cycle, an other kind of vehicle, and a metal product other than the body of the automobile, the motor cycle, and the other kind of vehicle.

Advantages of the Invention

The present invention is directed to a multi-layer coating film including a luster coat containing a luster material; a color coat applied on the luster coat and having translucency; and a coloring flake included in the luster coat and acting as the luster material to color a surface of a luster flake with a coloring material in the same type of color as a color type of the color coat. Such features contribute to reducing occurrence of color unevenness due to uneven thickness of the color coat. Moreover, adopting the coloring flakes may reduce, or eliminate, the additive amount of a pigment for reducing color unevenness to the luster coat. Little or no pigment reduces occurrence of color unevenness due to uneven dispersal of the pigment on or above the luster material, and moreover, the risk that the luster material is inappropriately oriented by the pigment. Such features are advantageous in maintaining brightness.

DESCRIPTION OF EMBODIMENTS

Described hereinafter are embodiments of the present invention, with reference to the drawings. Note that the embodiments below are essentially examples, and are not intended to limit the scope of the present invention, of the application of the present invention, or of the use of the present invention.

<First Embodiment>

Figure 1:
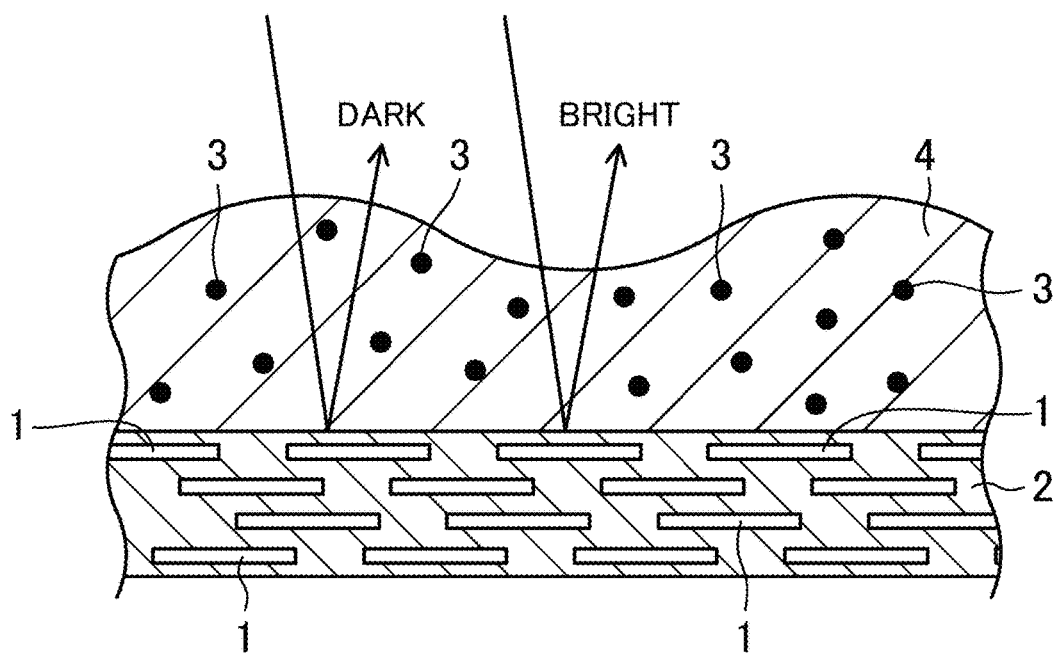
FIG. 1 is a cross-sectional view schematically illustrating a typical example of a multi-layer coating film.
Figure 2:
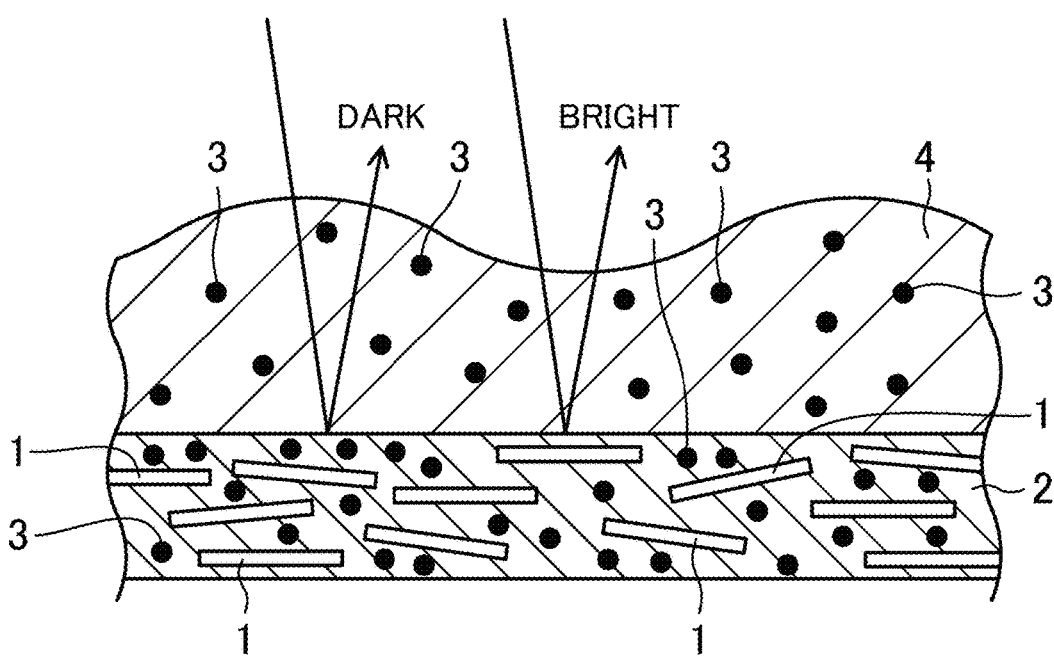
FIG. 2 is a cross-sectional view schematically illustrating another typical example of the multi-layer coating film.
Figure 3:
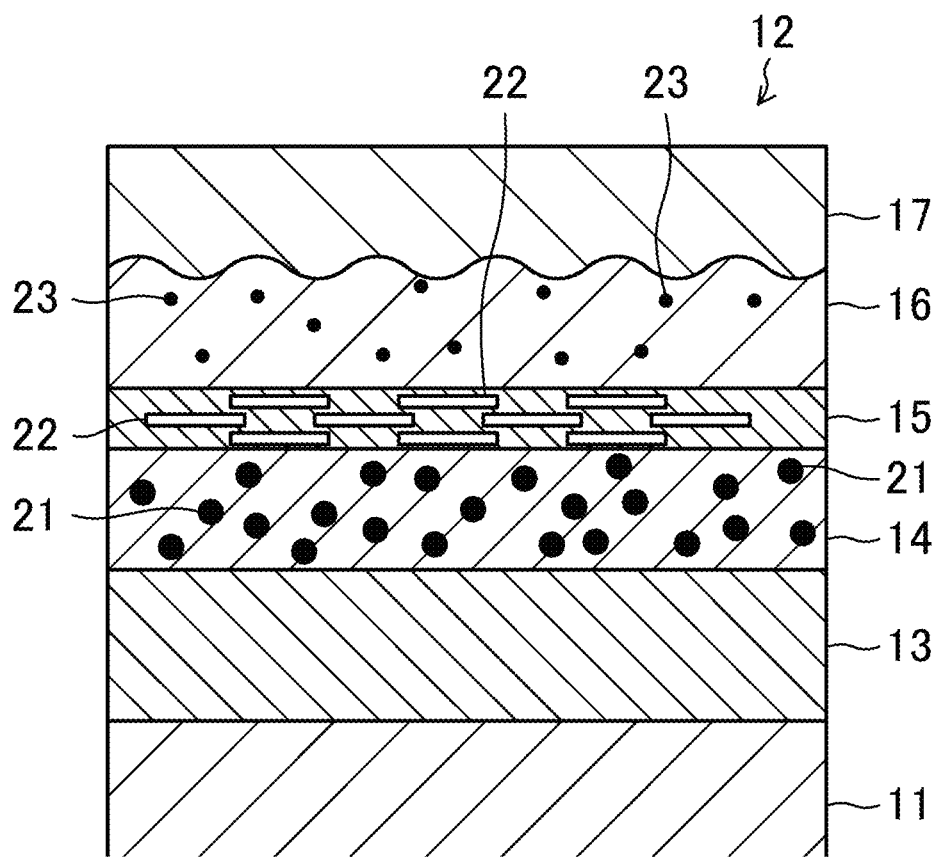
FIG. 3 is a cross-sectional view schematically illustrating a multi-layer coating film according to a first embodiment and a second embodiment of the present invention.

As illustrated in FIG. 3, a multi-layer coating film 12 is applied on a surface of an automotive body (a steel plate) 11 according to a first embodiment. The multi-layer coating film 12 includes: a color base coat 14, a luster coat 15, a color coat (black) 16 having translucency, and a transparent clear coat 17, all of which are applied on top of each other in a stated order. The surface of the automotive body 11 is provided with an electrodeposition coating film (a primer coat) 13 by cation electrodeposition coating. Provided on the electrodeposition coating film 13 is the multi-layer coating film 12. In this multi-layer coating film 12, the color base coat 14 is equivalent to a surfacer, and the luster coat 15, the color coat 16 and the transparent clear coat 17 are equivalent to a top coat.

The color base coat 14 includes a first pigment 21 dispersed therein. The luster coat 15 includes coloring flakes 22 dispersed therein as a luster material. The color coat 16 includes a second pigment 23 dispersed therein.

Examples of the first pigment 21 may be a black pigment such as commercially-available carbon black, graphite, and iron oxide black. The pigment has a particle size distribution with the peak in particle size ranging from 300 nm to 500 nm inclusive. Examples of the second pigment 23 may be the black pigment similar to the first pigment 21. Beneficially, examples of the second pigment 23 may be finely-powdered carbon black having a particle size distribution with the peak in particle size of 200 nm or smaller. The finely-powdered carbon black is made of commercially-available carbon black, which is wet-ground using grinding media such as beaded glass. This wet grinding allows the structure of the carbon black to be mechanically ground to have a smaller particle size.

The coloring flakes 22 of the luster coat 15 are oriented to be in substantially parallel with the surface of the luster coat 15. Paint containing the coloring flakes 22 is applied on the color base coat 14. Then, the paint is baked and the solvent in the paint evaporates, so that the coating film of the paint becomes thinner by volume contraction. Thinning the coating film allows the coloring flakes 22 to be arranged physically level.

Examples of a resin component for the color base coat 14 may be of polyester resin. Examples of a resin component for the luster coat 15 and the color coat 16 may be of acrylic resin. Examples of a resin component for the transparent clear coat 17 may be of acid-epoxy cure acrylic resin.

Figure 4:
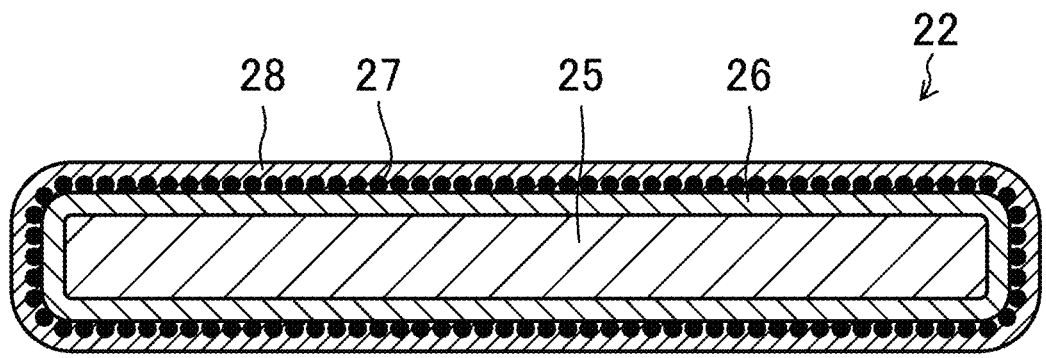
FIG. 4 is a cross-sectional view schematically illustrating an example of a coloring flake.

FIG. 4 illustrates an example of the coloring flakes 22. Each of these coloring flakes 22 includes: an aluminum flake 25 acting as a luster flake; an amorphous interior silica coat 26 covering a surface of the aluminum flake 25; a metal oxide coat formed of, for example, tin and zinc and covering the silica coat 26; a silver particle coat 27 formed of many silver particles evenly attached over an entire surface of the metal oxide coat; and an exterior silica coat 28 covering this silver particle coat 27. This coloring flake 22 produces a blackish visual effect by creating interference between light reflected from a surface of the interior silica coat 26 and light reflected from a surface of the silver particle coat 27. Specifically, the interior silica coat 26 and the silver particle coat 27 constitute a coloring material of the coloring flakes 22. This coloring material colors the coloring flakes 22 black which is the same type of color as that of the color coat 16.

When the color coat 16 is colored in achromatic color such as black as seen in the first embodiment, a difference in Munsell lightness value between the coloring flakes 22 and the color coat 16 is beneficially 5.0 or below if the coloring flakes 22 and the color coat 16 are to be colored in the same color type.

The aluminum flake 25 beneficially has a particle size ranging from 10 μm to 30 μm and a thickness ranging from 0.5 μm to 2 μm. The interior silica coat 26 beneficially has a thickness ranging from 10 nm to 100 nm. The metal oxide coat beneficially has a thickness of 10 nm or thinner. The silver particles beneficially have an average particle size ranging from 20 nm to 40 nm. The exterior silica coat 28 beneficially has a thickness ranging from 10 nm to 100 nm.

Stated below is an example of how to manufacture the coloring flakes 22. The aluminum flakes 25 are dispersed in a solvent. In the solvent, an organosilicon compound is hydrolyzed, and the silica is deposited on the surface of the aluminum flake 25 to form the interior silica coat 26. Furthermore, metal oxide is deposited on the surface of the interior silica coat 26 to form the metal oxide coat. Next, the electroless plating is used to evenly deposit the silver particles over the entire surface of the metal oxide coat to form the silver particle coat 27. The aluminum flake 25 with the silver particle coat 27 formed is stirred and blended with a silicon-containing solvent, so that a hydrated film is formed on the surface of the aluminum flake 25. The hydrated film is then heated to become the exterior silica coat 28.

EXAMPLE AND COMPARATIVE EXAMPLES

Example

Table 1 shows a configuration of a multi-layer coating film in Example.

TABLE 1

| Coating Film Layer | Kind of Materials | Solid Content Percent by Mass | Thickness (μm) |
|---|---|---|---|
| Transparent Clear Coat | Resin: Acid-epoxy Cure Acrylic Resin | 100 | 35 |
| Color Coat | Resin: Acrylic Resin | 99.7 | 10 |
|  | Pigment: Finely-Powdered Carbon Black (Peak Particle Size: 180 nm) | 0.3 |  |
| Luster Coat | Resin: Acrylic Resin | 75.0 | 2 |
|  | Luster Material: Coloring Flake | 25.0 |  |
| Base Coat | Resin: Polyester Resin | 65.7 | 15 |
|  | Pigment: Commercially-Available Carbon Black | 7.1 |  |
|  | Extender Pigment: Barium Sulfate | 27.2 |  |

Each of paints; namely a color base coat, a luster coat, a color coat, and a transparent clear coat, was applied on a steel plate via a wet-on-wet technique, and baked (heated at 140° C. for 20 minutes). The coloring flakes using the silver particles illustrated in FIG. 4 were adopted as a luster material of the luster coat.

Comparative Example 1

Table 2 shows a configuration of a multi-layer coating film in Comparative Example 1.

TABLE 2

| Coating Film Layer | Kind of Materials | Solid Content Percent by Mass | Thickness (μm) |
|---|---|---|---|
| Transparent Clear Coat | Resin: Acid-Epoxy Cure Acrylic Resin | 100 | 35 |
| Color Coat | Resin: Acrylic Resin | 99.7 | 10 |
|  | Pigment: Finely-Powdered Carbon Black (Peak Particle Size: 180 nm) | 0.3 |  |
| Luster Coat | Resin: Acrylic Resin | 75.0 | 2 |
|  | Luster Material: Aluminum Flake | 25.0 |  |
| Base Coat | Resin: Polyester Resin | 65.7 | 15 |
|  | Pigment: Commercially-Available Carbon Black | 7.1 |  |
|  | Extender Pigment: Barium Sulfate | 27.2 |  |

In Example 1, aluminum flakes are adopted as a luster material of the luster coat. Details of other coating film layers are the same as those in Example.

Comparative Example 2

Table 3 shows a configuration of a multi-layer coating film in Comparative Example 2.

TABLE 3

| Coating Film Layer | Kind of Materials | Solid Content Percent by Mass | Thickness (μm) |
|---|---|---|---|
| Transparent Clear Coat | Resin: Acid-Epoxy Cure Acrylic Resin | 100 | 35 |
| Color Coat | Resin: Acrylic Resin | 99.7 | 10 |
|  | Pigment: Commercially-available Carbon Black (Peak Particle Size: 180 nm) | 0.3 |  |
| Luster Coat | Resin: Acrylic Resin | 68.0 | 2 |
|  | Pigment: Commercially-available Carbon Black | 7.0 |  |
|  | Luster Material: Aluminum Flake | 25.0 |  |
| Base Coat | Resin: Polyester Resin | 65.7 | 15 |
|  | Pigment: Commercially-available Carbon Black | 7.1 |  |
|  | Extender Pigment: Barium Sulfate | 27.2 |  |

In Example 2, commercially-available carbon black (a pigment) was added to the luster coat, in addition to aluminum flakes (a luster material). Details of other coating film layers are the same as those in Example.

—Evaluation of Multi-layer Coating Film—

Figure 5:
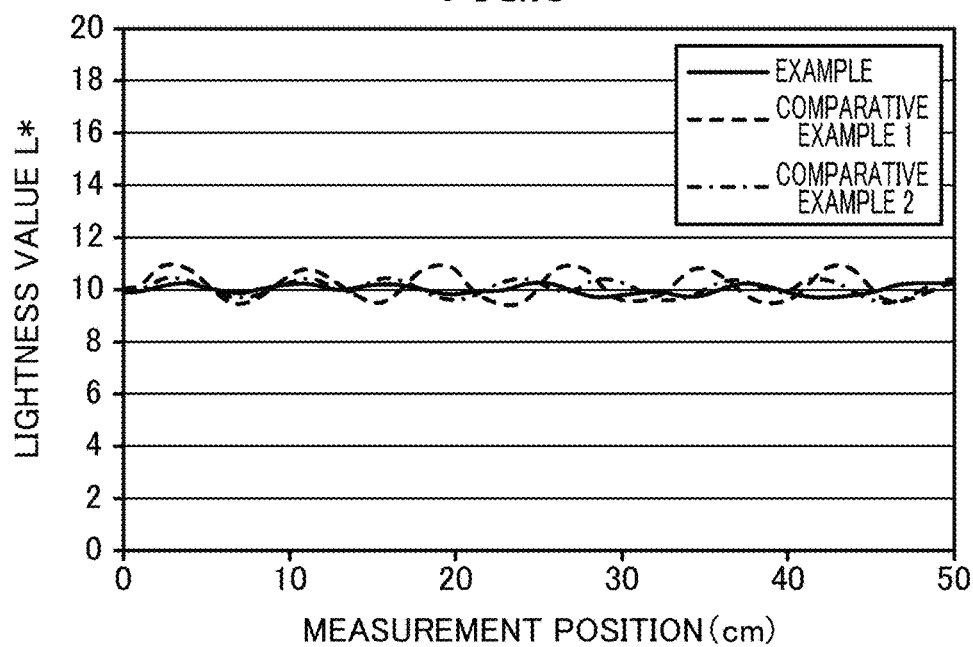
FIG. 5 is a graph illustrating a lightness value in an example, and comparative examples.
Figure 6:
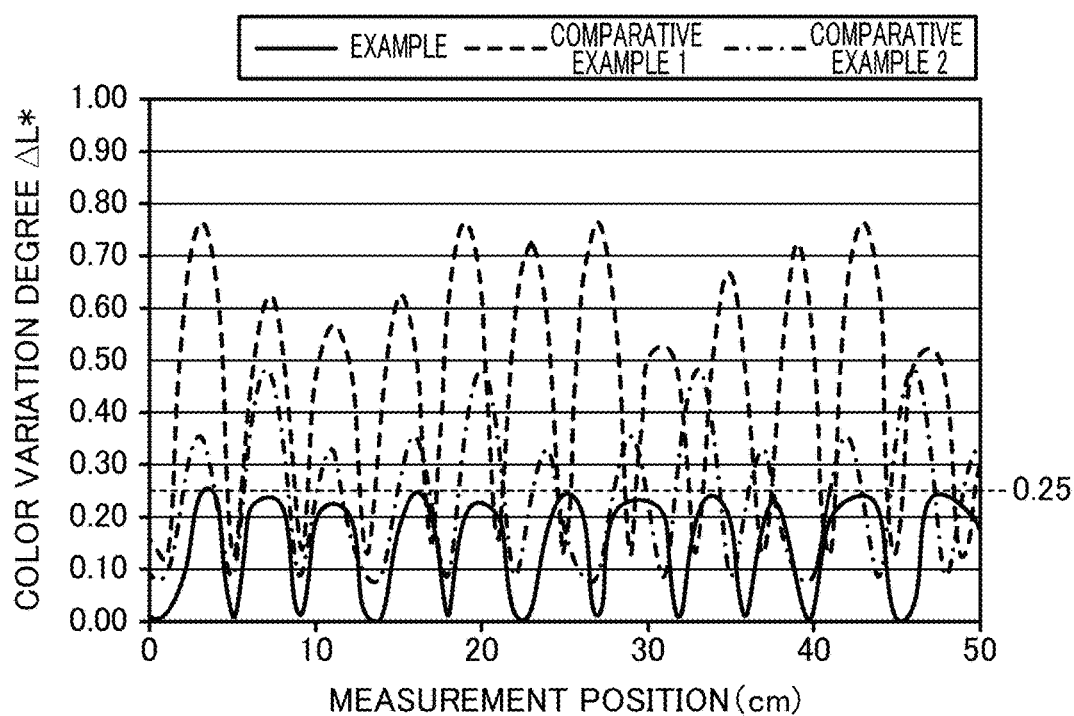
FIG. 6 is a graph illustrating a degree of color unevenness in the example, and the comparative examples.

Evaluations of color unevenness were carried out on the multi-layer coating films in Example and Comparative Examples 1 and 2. Specifically, a photometer was linearly moved in one direction on a multi-layer coating film and a lightness value L* was measured with 1 cm increment. An absolute value of a difference between the lightness value L* of each position and the average of the lightness values L* (i.e. L*(average)) was obtained as a color variation degree ΔL*(=|L*(average)−L*|). Here, L* was measured by a spectrophotometer in conformity with JIS Z 8722 (e.g. MA98 multi-angle spectrophotometer manufactured by X-rite Co., Ltd.) where an illumination angle is 45°, and a light receiving angle is 45° with respect to an angle of a specular reflection (i.e. receiving the light normal to the surface). FIG. 5 shows a lightness value L* for corresponding Example and Corresponding Examples 1 and 2. FIG. 6 shows color variation degrees ΔL* for corresponding Example and Corresponding Examples 1 and 2. An observer is less likely to recognize color unevenness with a ΔL* of 0.4 or below, and can hardly recognize color unevenness with a ΔL* of 0.25 or below.

FIG. 6 shows that the observer can hardly recognize color unevenness in Example. Unlike in Comparative Examples 1 and 2, color unevenness is hardly seen in Example because the coloring flakes 22 are adopted.

<Second Embodiment>

A second embodiment involves obtaining a chromatic paint color via a multi-layer coating film. The coating structure of the multi-layer coating film in the second embodiment is the same as that in the first embodiment illustrated in FIG. 3. However, the pigments 21 and 23, and the coloring flakes 22 in the second embodiment are different from those in Example.

Examples of the pigments 21 and 23 to be adopted are pigments in chromatic color such as a perylene pigment, a phthalocyanine blue pigment, and a diketo-pyrrolo-pyrrole pigment. Hence, the color coat 16 is colored in a chromatic color. In accordance with this chromatic color, the adopted coloring flakes 22 are made of luster flakes colored with a coloring material in a chromatic color of the same type as that of the color coat 16.

Figure 7:
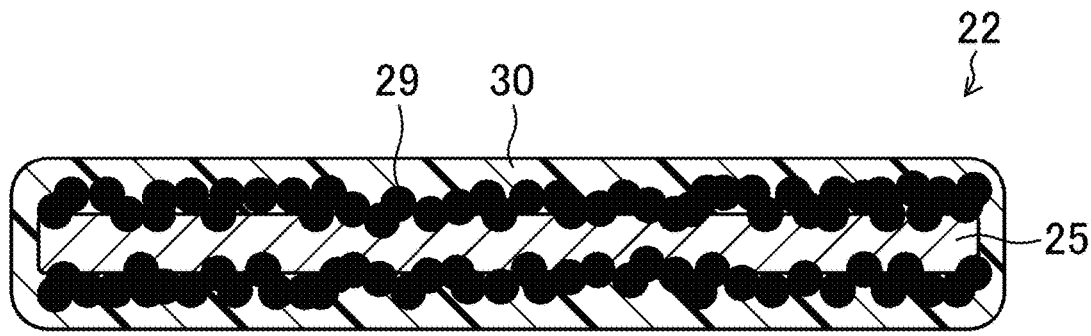
FIG. 7 is a cross-sectional view schematically illustrating another example of a coloring flake.
Figure 8:
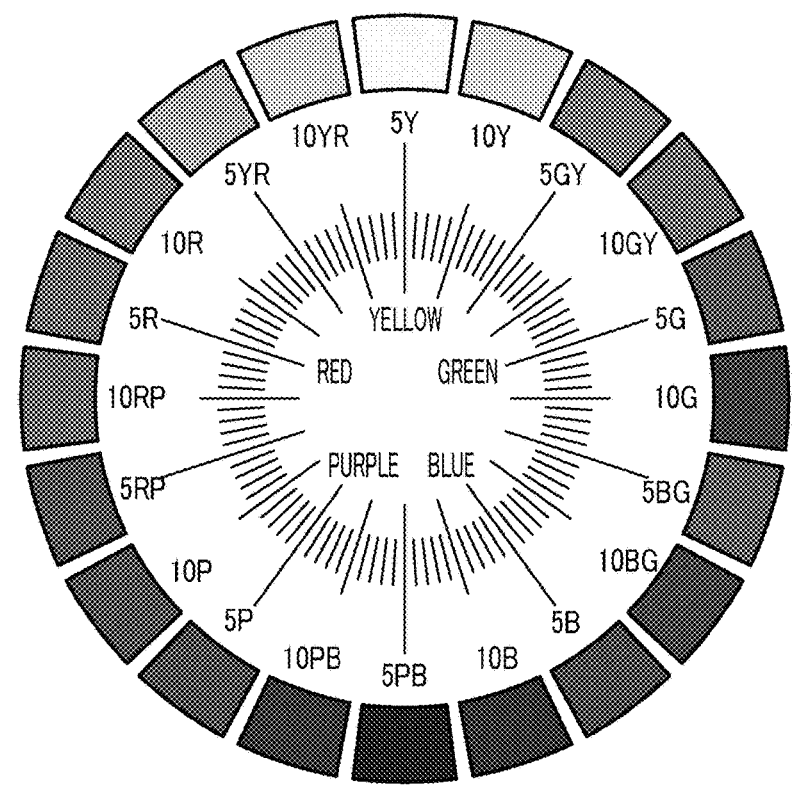
FIG. 8 is an illustration of a hue circle of the Munsell color circle.

FIG. 7 illustrates an example of the coloring flakes 22. Each of these coloring flakes 22 includes: the aluminum flake 25, acting as a luster flake, whose surface is covered with a resin base coat; a coloring material coat 29 formed of many coloring materials attached to a surface of the resin base coat; and a resin coat 30 covering the coloring material coat 29. The resin base coat and the resin coat 30 may be formed of, for example, a silica condensate or a polysiloxane condensate. Examples of the coloring material may be a pigment whose color type is the same as that of the pigments 21 and 23.

Here, the same color type in chromatic color means that the hue of the coloring flakes 22 is beneficially within the range of ±10 on the condition that a circle of the Munsell color circle is divided into 100 sectors, the hue of the color coat 16 is set to be a reference (0 position), and the hue circle includes a decreasing hue number to −50 in a clockwise direction and an increasing hue number to +50 in a counterclockwise direction.

Beneficially, the resin base coat has a thickness ranging from 5 nm to 100 nm, the coloring material has a primary particle size ranging from 20 nm to 100 nm, and the resin coat 30 has a thickness ranging from 10 nm to 100 nm inclusive.

The multi-layer coating film in the second embodiment also causes fewer color unevenness, and provides expected brightness.

In checking color unevenness of a chromatic color, a photometer is linearly moved in one direction on a multi-layer coating film, and lightness values $L^*$, $a^*$, and $b^*$ are measured with 1 cm increment. Here, $\Delta E = ((L^* - L^*(average))^2 + (a^* - a^*(average))^2 + (b^* - b^*(average))^2)^{1/2}$ is beneficially 0.8 or smaller (i.e. an observer is less likely to recognize color unevenness), and more beneficially 0.5 or smaller. (i.e. an observer can hardly recognize color unevenness.) The lightness values $L^*$, $a^*$, and $b^*$ are measured by a spectrophotometer in conformity with JIS Z 8722 (e.g. MA98 multi-angle spectrophotometer manufactured by X-rite Co., Ltd.) where an illumination angle is 45°, and a light receiving angle is 45° with respect to an angle of a specular reflection (i.e. receiving the light normal to the surface).

<Third Embodiment>

Figure 9:
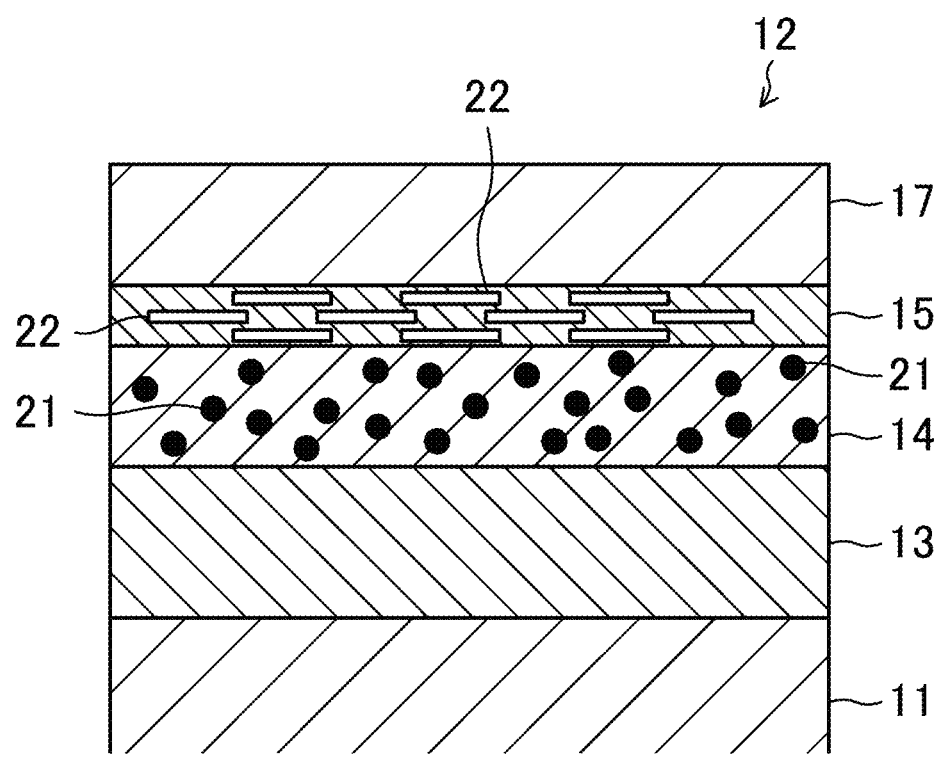
FIG. 9 is a cross-sectional view schematically illustrating a multi-layer coating film according to a third embodiment of the present invention.

As illustrated in FIG. 9, the multi-layer coating film 12 is applied on the surface of the automotive body (a steel plate) 11 according to a third embodiment. The multi-layer coating film 12 includes: the color base coat 14, the luster coat 15, and the transparent clear coat 17 applied on top of each other in a stated order. The surface of the automotive body 11 is provided with an electrodeposition coating film (a primer coat) 13 by cation electrodeposition coating. Provided on the electrodeposition coating film 13 is the multi-layer coating film 12. In this multi-layer coating film 12, the color base coat 14 is equivalent to a surfacer, and the luster coat 15 and the transparent clear coat 17 are equivalent to a top coat.

The color base coat 14 includes a pigment 21 having a deep color and dispersed in the color base coat 14. The luster coat 15 includes coloring flakes 22 dispersed therein as a luster material. Examples of the pigment 21 may be pigments having an average particle size ranging from 300 nm to 500 nm inclusive with various kinds of hues. These pigments include a black pigment such as carbon black, perylene black, and aniline black, or a red pigment such as perylene red. Examples of the coloring material for the coloring flakes 22 may be, for example, a pigment having the same type of color as the pigment 21 for the color base coat 14 has.

The coloring flakes 22 of the luster coat 15 are oriented to be in substantially parallel with the surface of the luster layer 15. Paint containing the coloring flakes 22 is applied on the base coat 14. Then, the paint is baked and the solvent in the paint evaporates, so that the coating film of the paint becomes thinner by volume contraction. Thinning coating film allows the coloring flakes 22 to be arranged physically level.

Examples of a resin component for the color base coat 14 may be of polyester resin. Examples of a resin component for the luster coat 15 may be of acrylic resin. Examples of a resin component for the transparent clear coat 17 may be of acid-epoxy cure acrylic resin.

Described next are the coloring flakes 22.

[Exposure-Coloring Flake]

Figure 10:
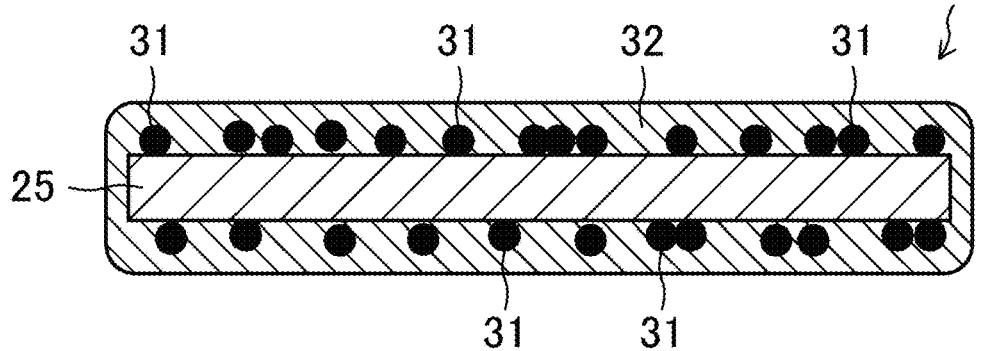
FIG. 10 is a cross-sectional view schematically illustrating an example of a coloring flake.
Figure 11:
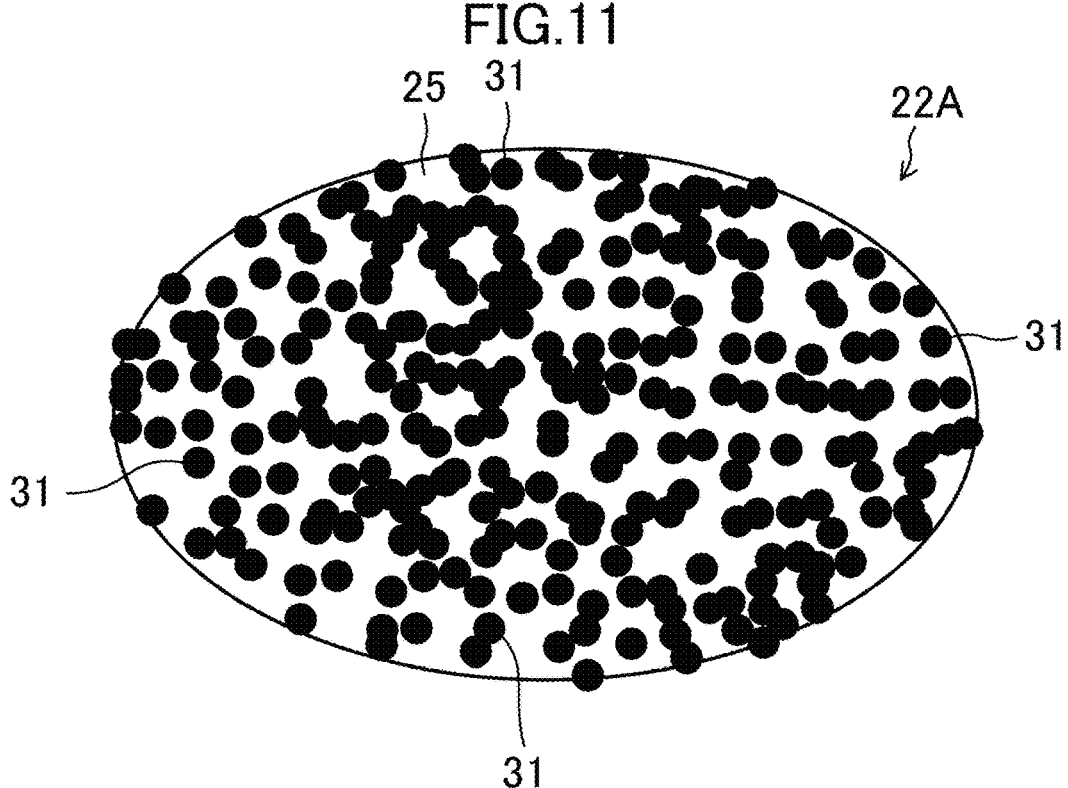
FIG. 11 is a plan view schematically illustrating the coloring flake.

FIGS. 10 and 11 illustrate an exposure-coloring flake 22A acting as a coloring flake 22. The exposure-coloring flake 22A includes: the aluminum flake 25 acting as a luster flake; and a granular coloring material (a pigment) 31 dispersedly attached to a surface of the aluminum flake 25, such that the aluminum flake 25 is partially exposed. The entire aluminum flake 25 to which the coloring material 31 is attached is covered with a resin coat 32. This coloring flake 22A is referred to as "an exposure-coloring flake" for the sake of convenience since the aluminum flake 25 is partially exposed. This exposure-coloring flake 22A may be manufactured by, for example, dip coating and vapor-deposition.

[Dip Coating]

A coloring material, a silane coupling agent, and a solvent a d together, and the coloring material is dispersed through the mixture by a ball mill. To the mixture, aluminum flake paste and a solvent are added, and the coloring material is further dispersed together with the aluminum flake paste through the mixture by the ball mill to obtain slurry. A solvent is added to the obtained slurry, and balls for dispersion are removed. The slurry is left as it is, so that the aluminum flakes to which the coloring material is attached are precipitated. Then, the solvent is removed.

Next, the obtained aluminum flakes are coated with resin. The slurry, including a hydrocarbon solvent or an alcoholic solvent having the colored aluminum flakes dispersed therein, is heated and stirred together with such a monomer as acrylic acid, methacrylic acid, methyl methacrylate, butyl acrylate, and such a polymerization initiator as benzoyl peroxide, and isobutyl peroxide. As a result, the monomer is polymerized so that the resin is deposited on the surface of the aluminum flakes.

In the above dip coating, carbon black is adopted as the coloring material. Used in the dip coating are: 1 g of carbon black, 0.5 g of silane coupling agent, 10 g of solvent (mineral spirit), and 10 g of aluminum flake paste (an aluminum flake has an average particle size of 30 μm and an average thickness of 1 μm). The carbon black is dispersedly attached to the aluminum flakes, and 60% of the surface area of each aluminum flake is exposed.

[Vapor-Deposition]

In a vacuum container equipped with a powder fluidizer and a resistance heater, vapor-deposition involves vaporizing a coloring material while fluidizing aluminum flakes, and allowing the coloring material to be attached to the aluminum flakes. Examples of the powder fluidizer include a rotary fluidizer equipped with a barrel rotary vacuum chamber. The resistance heater includes, for example, a DC power source, a pair of copper electrodes, and a resistive element made of a stainless mesh. The copper electrodes are connected to an electric wire led from the DC power source into the vacuum chamber. The resistive element made of the stainless mesh is bolted to the copper electrodes, so as to be located in the middle of the vacuum chamber.

Slurry including aluminum flakes dispersed into acetone is vacuum filtered, and then dried with hot air at a temperature of 200° C. so that aluminum flakes are obtained in the form of dry powder. The aluminum flakes are put in the vacuum chamber, and the coloring material is supported on the stainless mesh. The vacuum in the vacuum chamber is reduced to $10^{-4}$ toor or lower. While the vacuum chamber is rotated by a rotor to fluidize the aluminum flakes, an electrical current is applied to the copper electrodes to heat and vaporize the pigment. After the pigment is vaporized, the aluminum flakes are cooled approximately to a room temperature. Such a process may produce aluminum flakes to which the coloring material is dispersedly attached.

Next, the obtained aluminum flakes are coated with resin. The slurry, including a hydrocarbon solvent or an alcoholic solvent having the colored aluminum flakes dispersed therein, is heated and stirred together with such a monomer as acrylic acid, methacrylic acid, methyl methacrylate, and butyl acrylate, and such a polymerization initiator as benzoyl peroxide, and isobutyl peroxide. As a result, the monomer is polymerized so that the resin is deposited on the surface of the aluminum flakes.

In the above vapor-deposition, carbon black is adopted as the coloring material. Used in the vapor-deposition are: 10 g of carbon black, and 20 g of aluminum flakes (an aluminum flake has an average particle size of 30 μm and an average thickness of 1 μm). A power of 10 volts at 40 amperes is conducted through the electrodes, and the coloring material is heated and vaporized for 60 minutes. The carbon black is dispersedly attached to the aluminum flakes, and 50% of the surface area of each aluminum flake is exposed.

In the above dip coating and vapor-deposition, the coloring material and translucent beads, such as acrylic beads, are blended together and attached to the aluminum flakes to cover the entire surfaces of the aluminum flakes. In this case, too, the coloring material is dispersedly attached to each of the aluminum flakes, and the translucent beads are attached to portions of the aluminum flake. Since these portions optically expose the aluminum flake through the translucent beads, the obtained coloring flake may be referred to as an exposure-coloring flake.

[Mixed-Coloring Flake]

Figure 12:
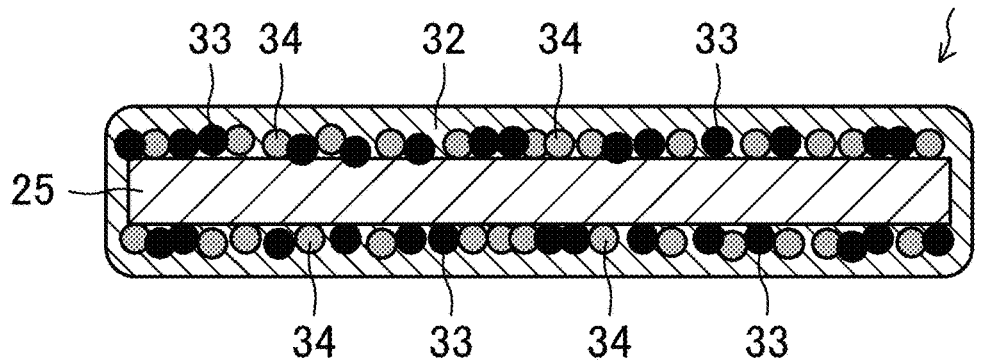
FIG. 12 is a cross-sectional view schematically illustrating another example of the coloring flake.
Figure 13:
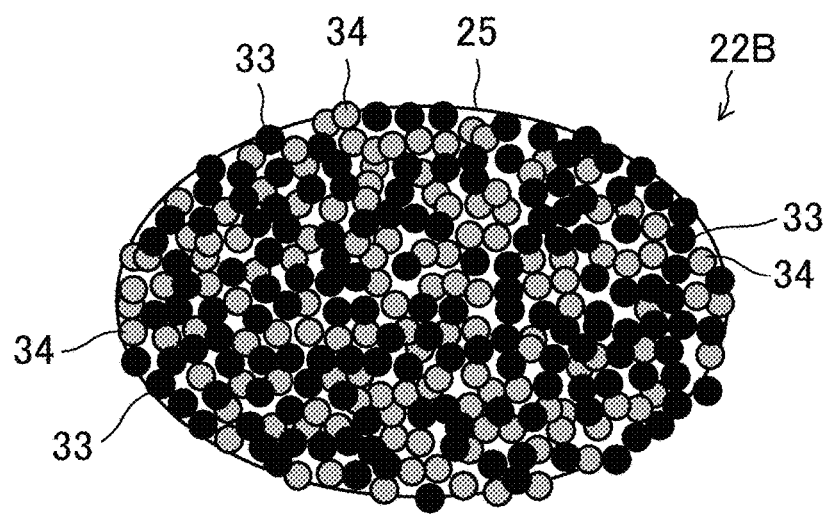
FIG. 13 is a plan view schematically illustrating the coloring flake.

FIGS. 12 and 13 illustrate a mixed-coloring flake 22B acting as still another example of the coloring flakes 22. The mixed-coloring flake 22B includes the aluminum flake 25 whose surface is covered with two kinds of granular coloring materials 33 and 34 each having a different total luminous transmittance of visible light. Furthermore, the entire aluminum flake 25, to which the coloring materials 33 and 34 are attached, is covered with the resin coat 32. The two kinds of coloring materials 33 and 34 each having a different total luminous transmittance are attached to the surface of the aluminum flake 25 in a mottled state. Including multiple kinds of coloring materials mixed together, each of coloring flakes 22B is referred to as a "mixed-coloring flake" for the sake of convenience.

This mixed-coloring flake 22B may also be prepared by the above dip coating and the vapor-deposition. In using the dip coating, the mixed-coloring flakes 22B may be prepared in a similar manner as the exposure-coloring flakes are, except that multiple kinds of coloring materials are mixed with a silane coupling agent and a solvent, and the coloring materials are dispersed through the mixture by a ball mill. In using the vapor-deposition, the mixed-coloring flakes 22B may be prepared in a similar manner as the exposure-coloring flakes are, except that the multiple kinds of coloring materials are mixed together and supported on the stainless mesh.

In the dip coating, adopted as coloring materials are carbon black and aniline black each having a different total luminous transmittance. Used in the dip coating are: 0.5 g of carbon black, 0.5 g of aniline black, 0.5 g of silane coupling agent, 10 g of solvent (mineral spirit), and 10 g of aluminum flake paste (an aluminum flake has an average particle size of 30 μm and an average thickness of 1 μm). The carbon black and the aniline black are attached to the aluminum flakes in a mottled state, and 60% of the surface area of each aluminum flake is covered with the aniline black.

In the vapor-deposition, carbon black and aniline black are adopted as coloring materials. Used in the vapor-deposition are: 15 g of carbon black, 15 g of aniline black, and 20 g of aluminum flakes (an aluminum flake has an average particle size of 30 μm and an average thickness of 1 μm). A power of 10 volts at 40 amperes is conducted through the electrodes, and the coloring materials are heated and vaporized for 60 minutes. The carbon black and the aniline black are attached to the aluminum flakes in a mottled state, and 50% of the surface area of each aluminum flake is covered with aniline black.

Here, the carbon black has a refractive index of 1.8, and the aniline black has a refractive index of 1.58. Since a smaller refractive index provides a higher total luminous transmittance, controlling a rate of an area on the aluminum flake covered by each of the coloring materials having a different refractive index may adjust a characteristic of light reflected off the mixed-coloring flake.

[Characteristic of Light Reflected Off Exposure-Coloring Flake]

A study was conducted on an exposure-coloring flake for how a light reflectance was affected by (i) a rate of an exposed area on an aluminum flake and (ii) a particle size of a coloring material. The light reflectance was a specular reflectance (reflecting at a 10° angle) when incident light is at a 10° angle with the surface normal of the coloring flake determined as a reference. The incident light has a wavelength of 630 nm.

Figure 14:
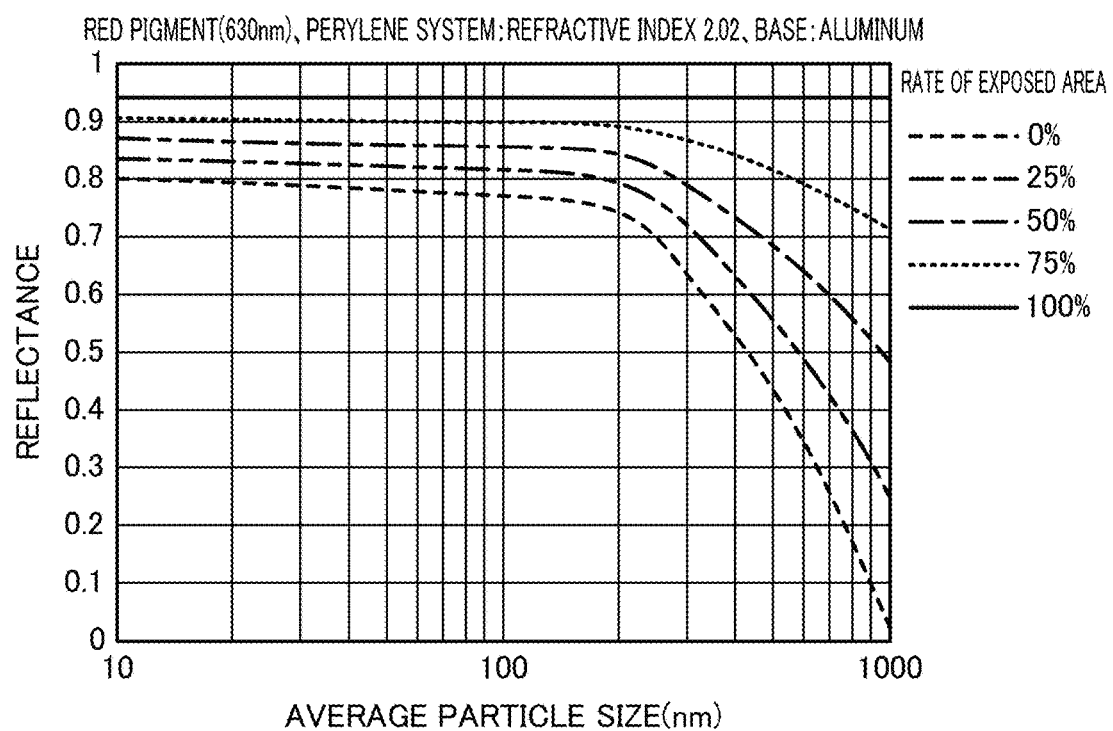
FIG. 14 is a graph showing how a light reflectance is affected by (i) a rate of an exposed area of an aluminum flake included in an exposure-coloring flake using a red pigment and (ii) a particle size of the red pigment.
Figure 15:
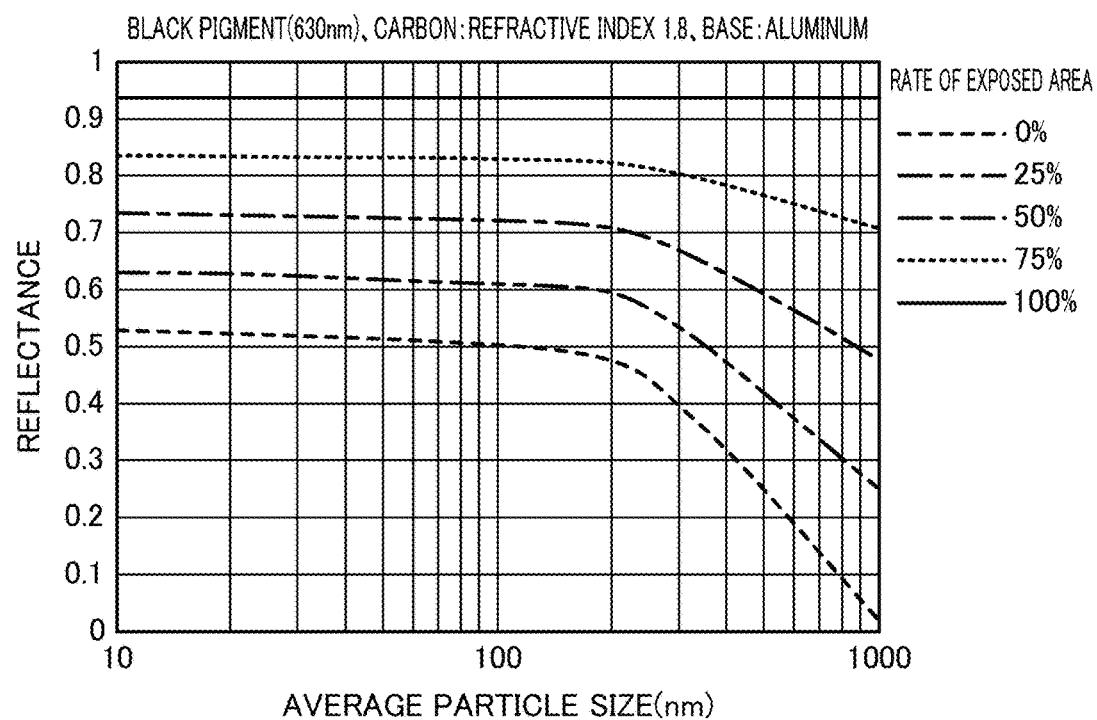
FIG. 15 is a graph showing how a light reflectance is affected by (i) a rate of an exposed area of an aluminum flake included in an exposure-coloring flake using a black pigment and (ii) a particle size of the black pigment.

FIG. 14 shows a case where perylene red having a refractive index of 2.02 was used as a red pigment. FIG. 15 shows a case where carbon black having a refractive index of 1.8 was used as a black pigment. In either case, the reflectance increases with a larger rate of an exposed area. Moreover, the reflectance significantly decreases when the average particle size is greater than 200 nm.

<How FI is Affected by Factors Such as Rate of Exposed Area on Exposure-Coloring Flake>

Prepared were (i) coloring materials, namely two kinds of carbon black one having an average particle size of 200 nm and the other having an average particle size of 400 nm, and (ii) luster flakes, namely aluminum flakes. Then, multiple kinds of exposure-coloring flakes were formed. Here, each kind of the exposure-coloring flakes was different in rate of an exposed area. These exposure-coloring flakes were used to form a luster coat on a substrate, and a transparent clear coat was formed on the luster coat. Hence, more than one sample was formed. The luster coat was formed of sprayed acrylic base paint in which coloring flakes had been dispersed therein. The coloring flakes were oriented in substantially parallel with a surface of the luster coat, and arranged not to expose the substrate between the coloring flakes. The transparent clear coat was formed of sprayed acrylic clear paint.

The obtained samples were different in average particle size of a coloring material, and rate of the exposed area on aluminum flakes, for the exposure-coloring flakes included in each luster coat. Then, an FI of each sample was measured.

Figure 16:
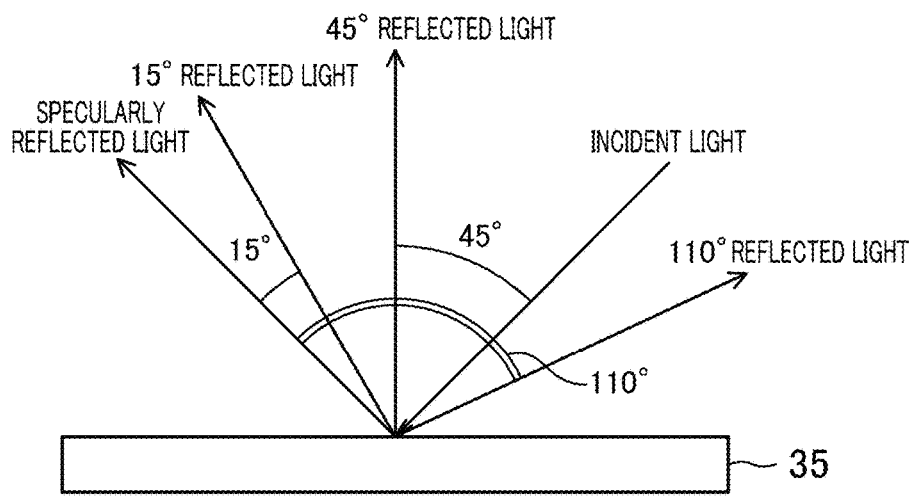
FIG. 16 is an illustration of reflected light to be used for calculating an FI.

When light enters the surface of a sample 35 with an angle of 45° to the surface normal as illustrated in FIG. 16, an FI was obtained with the expression below based on (i) a lightness index L*45° of reflected light (reflected light at a 45° angle) angled at 45° from the direction of a specular reflection toward the direction of incident light, (ii) a lightness index L*15° of reflected light (reflected light at a 15° angle) angled at 15° from the direction of the specular reflection toward the direction of the incident light, and (iii) a lightness index L*110° of reflected light (reflected light at a 110° angle) angled at 110° from the direction of the specular reflection toward the direction of the incident light.

$$FI=2.69 \times (L*15°-L*110°)^{1.11}/L*45°^{0.86}$$

Figure 17:
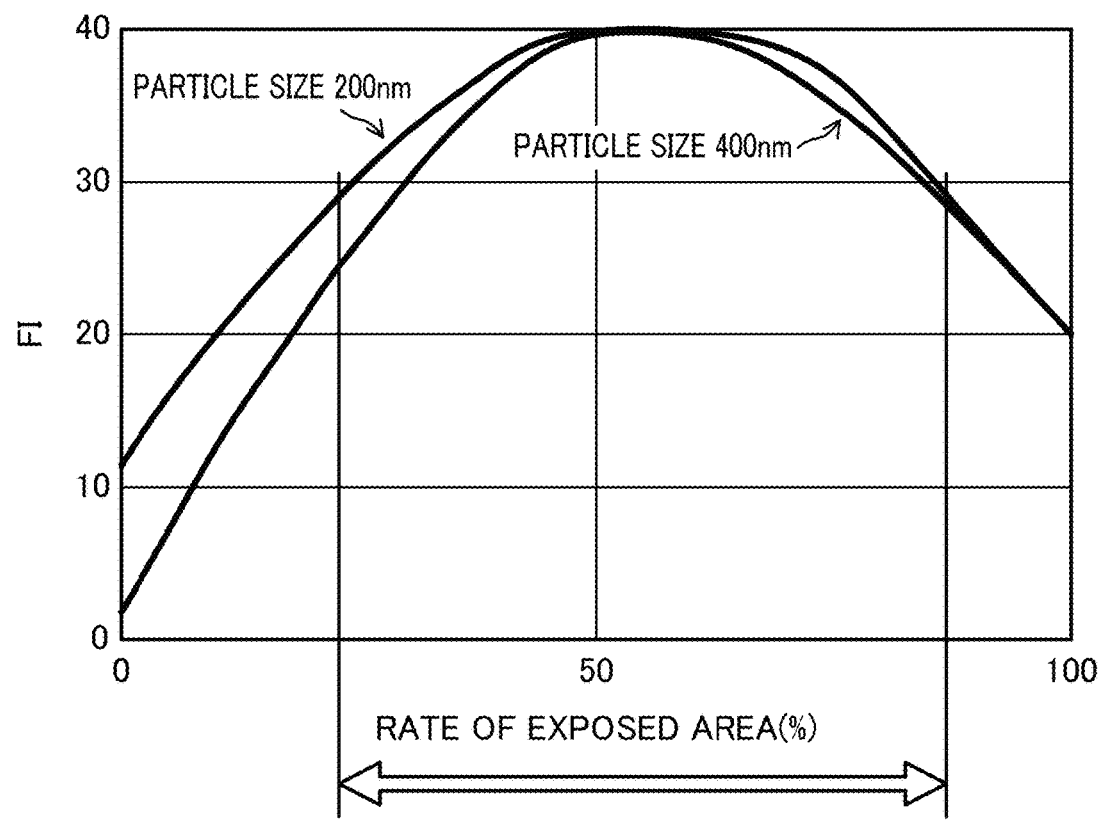
FIG. 17 is a graph showing how the FI is affected by (i) a rate of an exposed area of an aluminum flake included in an exposure-coloring flake and (ii) a particle size of a pigment.
Figure 18B:
FIGS. 18A to 18D show how a reflecting angle of the reflected light changes a degree of blocking the reflected light by a coloring material in an exposure-coloring flake having an exposed area rate of 40%.
Figure 18D:
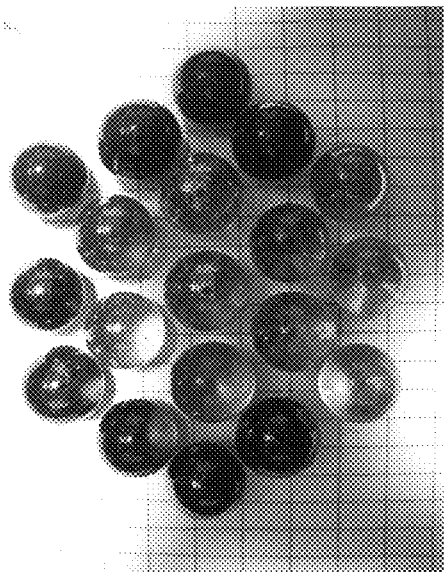
Figure 18A:
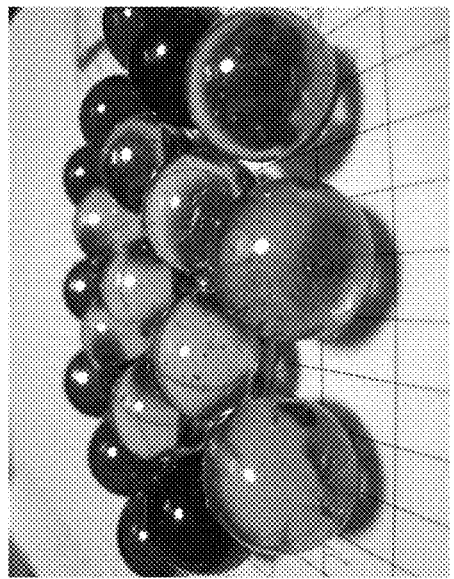
Figure 18C:
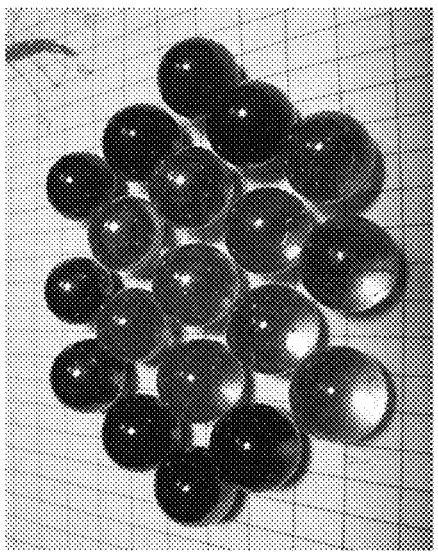

FIG. 17 shows a result of the measurement. In either case; that is when the average particle sizes were 200 nm and 400 nm, the FI rose with increasing rate of the exposed area from zero percent. After the FI peaked when the rate of the exposed area reached approximately from 50% to 60% inclusive, the FI tended to fall with increasing rate of the exposed area.

The reason why the FI rises with increasing rate of the exposed area from zero percent is that the reflected light at a 15° angle is brighter as the exposed area of the aluminum flakes becomes wider. In contrast, the FI peaks when the rate of the exposed area reaches approximately from 50% to 60% inclusive, and then falls with increasing rate of the exposed area. This is because excessive exposure of the aluminum flakes reduces the degree of blocking the reflected light at a 110° angle by the coloring material.

Studied here is a degree of blocking reflected light by a coloring material. FIGS. 18 (A) to (D) show how a degree of blocking reflected light by a coloring material varies with a reflecting angle of the reflected light. Glass balls were adopted as a model of the coloring material on the assumption that the particles of the coloring material were all in a spherical shape and having a uniform particle size. Multiple glass balls were placed on a plate to be substantially equally spaced from one another, so that 40% of the area of the plate was exposed. Then, an angle of depression was changed, and a photo was taken at each angle of depression to study how much of the plate appeared among the glass balls. FIG. 18 (A) shows a case where the angle of depression was at 20° (in a direction of reflected light at a 115° angle). FIG. 18 (B) shows a case where the angle of depression was at 30° (in a direction of reflected light at a 105° angle). FIG. 18 (C) shows a case where the angle of depression was at 45° (in a direction of reflected light at a 90° angle). FIG. 18 (D) shows a case where the angle of depression was at 90° (in a direction of reflected light at a 45° angle).

FIG. 18 show that the smaller the angle of depression was, the narrower the face of the plate appeared among the glass balls. When the angle of depression was at 20° (in the direction of the reflected light at a 115° angle), the face of the plate disappeared. A smaller angle of depression made the plate harder to be seen. If this is applied to the case of coloring flakes, for example, the reflected light at a 110° angle off an aluminum flake is blocked by the coloring material, and the intensity of the reflected light becomes significantly low. Thus, it means that FI is high (i.e. achieving a great flip-flop effect).

FIG. 18 represent a case where 40% of the area is exposed. An increase in a rate of the exposed area causes a drop, for the increase, in the degree of blocking the reflected light by the coloring material. Hence, as illustrated in FIG. 17, when the rate of the exposed area is higher than 60%, the FI tends to fall. When 100% of area on the aluminum flakes is exposed, the FI is of the aluminum flakes themselves.

Moreover, FIG. 17 shows that the H is higher with the average particle size of 200 nm than of 400 nm. This is because a smaller particle size allows the light to pass through the coloring material more easily. In other words, diffuse reflection of the light on the coloring material is reduced.

The result in FIG. 17 shows that a higher FI is achieved when (i) the rate of the exposed area beneficially ranges approximately from 20% to 85% inclusive (i.e. an FI of 30 or higher with an average particle size of 200 nm), and (ii) the average particle size of the coloring material is beneficially small; that is for example, 300 nm or smaller.

[Characteristic of Light Reflected Off Mixed-Coloring Flake]

A study was conducted on two kinds of coloring-material-mixed-coloring flakes for how a light reflectance was affected by (i) an area rate of the coloring materials having a high total luminous transmittance (an area rate of the coloring materials to a surface area of the aluminum flakes) and (ii) a particle size of the two kinds of the coloring materials. A light reflectance was measured under the same condition as that measured for the exposure-coloring flakes.

Figure 19:
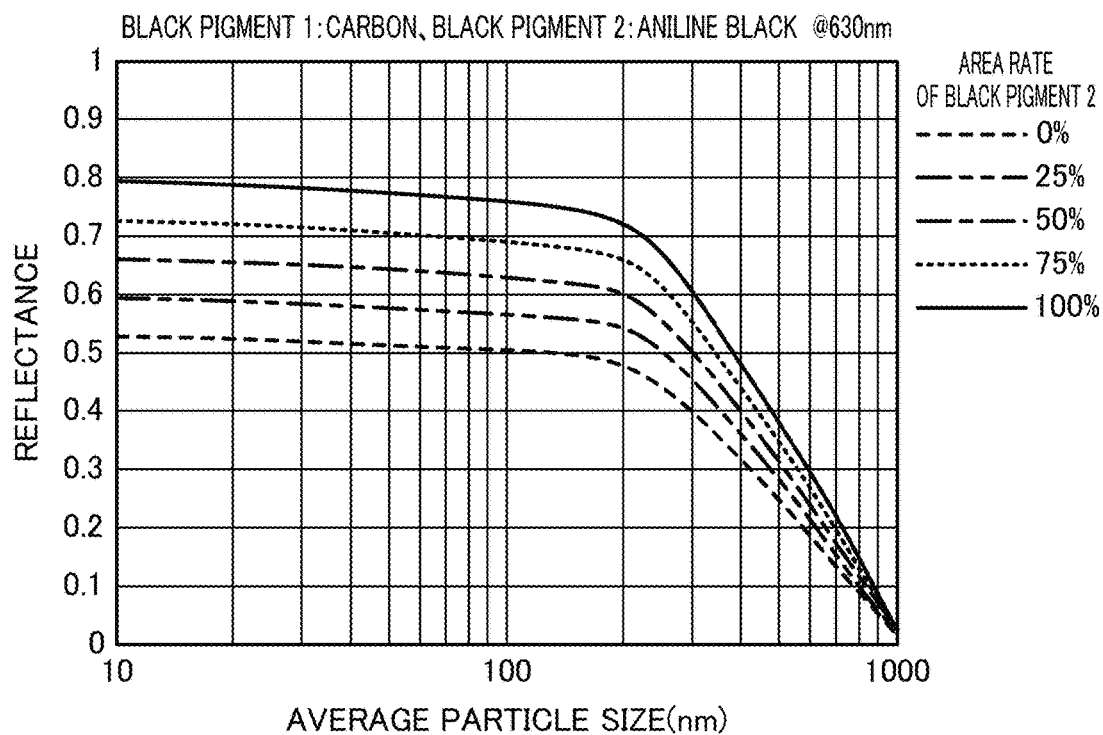
FIG. 19 is a graph showing how a light reflectance is affected by (i) an area rate of a black pigment 2 included in a mixed-coloring flake and (ii) a particle size of the black pigment 2.

FIG. 19 shows a case where carbon black having a refractive index of 1.8 is used as a coloring material with a low total luminous transmittance, and aniline black having a refractive index of 1.58 is used as a coloring material with a high total luminous transmittance. In this case, too, the reflectance increases with a larger area rate of aniline black. Moreover, the reflectance significantly decreases when the average particle size is greater than 200 nm.

<How FI is Affected by Factors Such as Area Rate of Coloring Material on Mixed-Coloring Flake>

Prepared were (i) coloring materials, namely carbon black and aniline black each having an average particle size of 200 nm and carbon black and aniline black each having an average particle size of 400 nm, and (ii) luster flakes, namely aluminum flakes. Then, multiple kinds of mixed-coloring flakes including carbon black and aniline black were formed. Here, the coloring materials are different in area rate of aniline black and average particle size. These mixed-coloring flakes were used to form a luster coat on a substrate, and a transparent clear coat was formed on the luster coat. Hence, more than one sample was formed. The luster coat was formed of sprayed acrylic base paint in which coloring flakes had been dispersed therein. The coloring flakes were oriented in substantially parallel with a surface of the luster coat, and arranged not to expose the substrate between the coloring flakes. The transparent clear coat was formed of sprayed acrylic clear paint.

The obtained samples were different in area rate of the aniline black and average particle size of a coloring material for the mixed-coloring flakes included in each luster coat. Then, an FI of each sample was measured.

Figure 20:
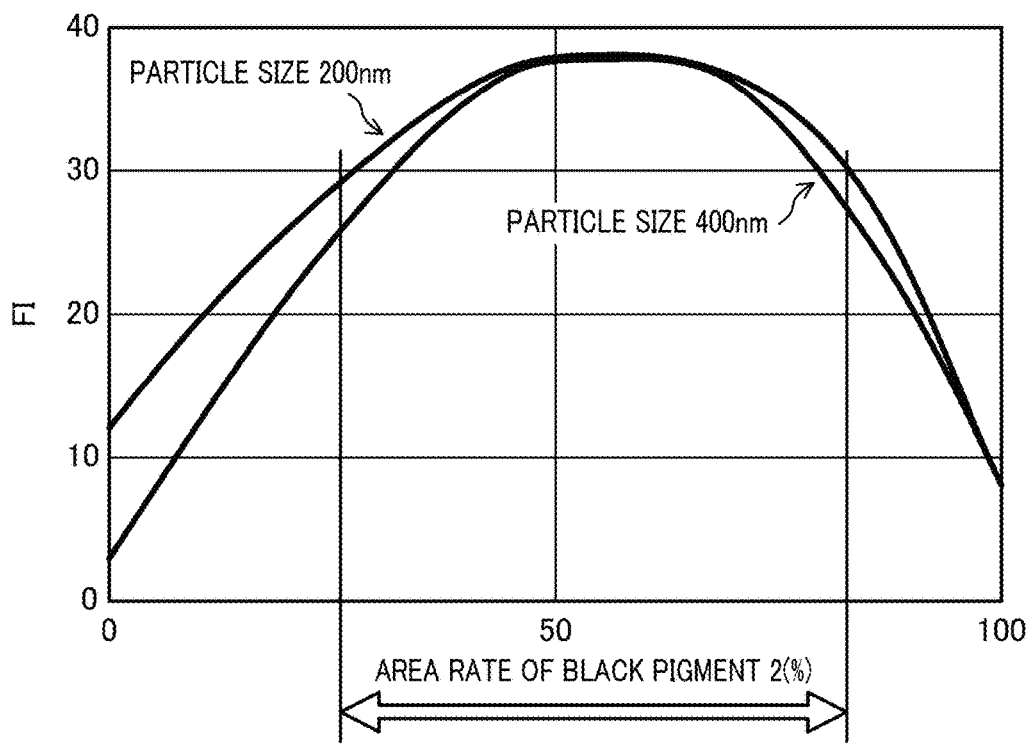
FIG. 20 is a graph showing how the FI is affected by (i) an area rate of the black pigment 2 included in the mixed-coloring flake and (ii) the particle size of the black pigment 2.

FIG. 20 shows a result of the measurement. In either case; that is when the average particle sizes were 200 nm and 400 nm, the H rose with an increasing area rate of the aniline black from zero percent. After the FI peaked when the area rate reached approximately from 50% to 60% inclusive, the FI tended to fall with the increasing area rate.

The reason why the FI rises with an increasing area rate of the aniline black from zero percent is that the light reflected off the aluminum flakes is brighter as the area occupied by the aniline black, having a high total luminous transmittance, becomes wider. In contrast, the FI peaks when the area rate reaches approximately from 50% to 60% inclusive, and then falls with an increasing area rate. This is because excessive occupation of the area by the aniline black reduces the degree of blocking the light, reflected off the aluminum flakes, by the coloring material.

Moreover, similar to the case of the exposure-coloring flakes, FI is higher with the average particle size of 200 nm than of 400 nm.

The result in FIG. 20 shows that a higher FI is achieved when (i) the area rate of a coloring material with a high total luminous transmittance beneficially ranges approximately from 25% to 80% inclusive (i.e. an FI of 30 or higher with an average particle size of 200 nm), and (ii) the average particle size of a coloring material is beneficially small; that is for example, 300 nm or smaller.

DESCRIPTION OF REFERENCE CHARACTERS

11 Automotive Body (Steel Plate)
12 Multi-Layer Coating Film
13 Electrodeposition Coating Film
14 Color Base Coat
15 Luster Coat
16 Color Coat
17 Transparent Clear Coat
21 First Pigment
22 Coloring Flake
22A Exposure-Coloring Flake
22B Mixed-Coloring Flake
23 Second Pigment
25 Aluminum Flake
26 Interior Silica Coat (included in a coloring material)
27 Silver Particle Coat (included in a coloring material)
29 Coloring Material Coat
31 Coloring Material
32 Resin Coat
33 Coloring Material (having a low total luminous transmittance)
34 Coloring Material (having a high total luminous transmittance)

The invention claimed is:

1. A multi-layer coating film comprising:
   a luster coat containing a coloring flake; and
   a color coat applied on the luster coat and having translucency; wherein:
   the color coat is colored black,
   the coloring flake comprises a luster flake, and two black coloring materials each having a different total luminous transmittance of visible light, and the two black coloring materials being attached to the surface of the luster flake in a mottled state to color the surface of the luster flake black, and
   in the coloring flake, one of the two black coloring materials is higher in the total luminous transmittance than another one of the two black coloring materials, the one black coloring material having an area rate ranging from 25% to 80% inclusive, the area rate being an area percentage of a surface of the luster flake occupied by the one black coloring material.

2. The multi-layer coating film of claim 1, wherein the coloring material is granular, and has an average particle size of 300 nm or smaller.

3. The multi-layer coating film of claim 1, wherein the luster flake is an aluminum flake.

4. The multi-layer coating film of claim 1, wherein the luster coat is applied on a black color base coat.

5. The multi-layer coating film of claim 1, wherein a transparent clear coat is applied on the color coat.

6. A coated object to which the multi-layer coating film of claim 1 is applied.

7. The multi-layer coating film of claim 1, wherein the two black coloring materials are granular, and have an average particle size of 300 nm or smaller.

* * * * *